UNITED STATES PATENT OFFICE.

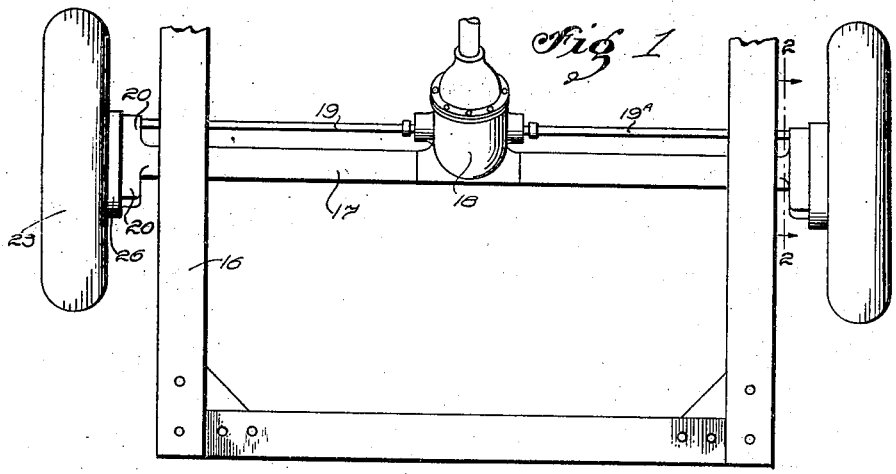
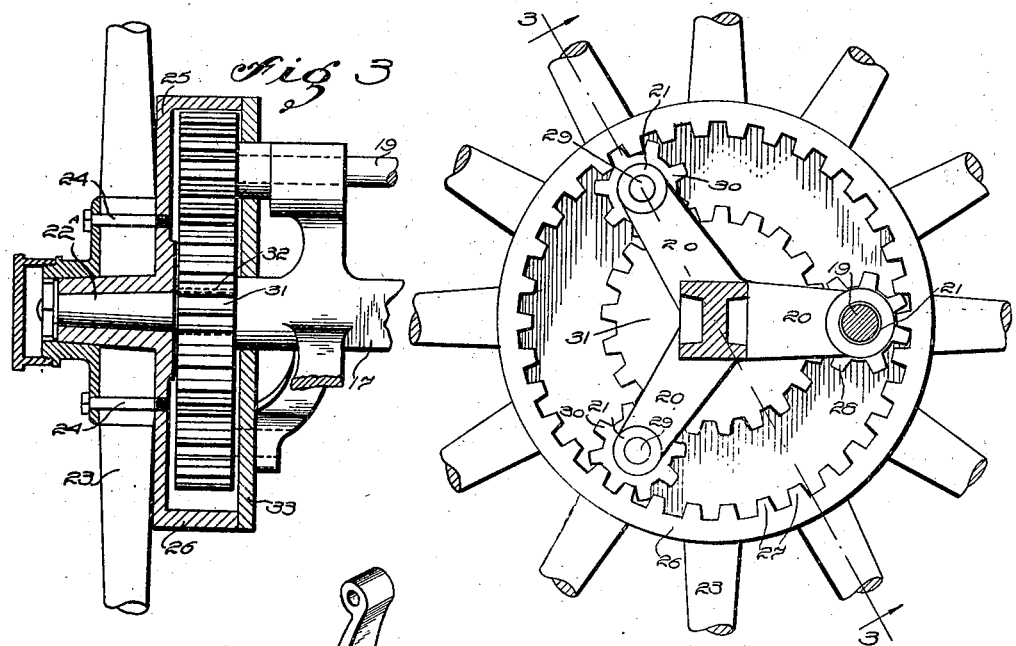
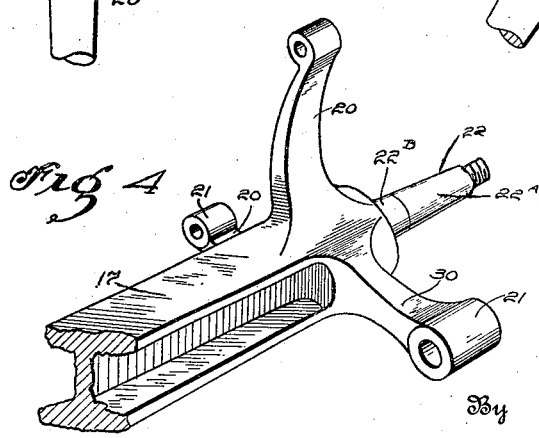

EDGAR JAMES, OF LINCOLNTON, NORTH CAROLINA.

AUTOMOBILE-DRIVE.

1,352,131.   Specification of Letters Patent.   Patented Sept. 7, 1920.

Original application filed June 21, 1919, Serial No. 305,725. Divided and this application filed April 19, 1920. Serial No. 375,050.

*To all whom it may concern:*

Be it known that I, EDGAR JAMES, a citizen of the United States, residing at Lincolnton, in the county of Lincoln and State of North Carolina, have invented certain new and useful Improvements in Automobile-Drives, of which the following is a specification.

This invention relates to improvements in driving gearing for automobile wheels and the like, and more particularly to driving gearing particularly adapted for use on the driving wheels of a motor truck.

An important object of the invention is to provide a form of gearing for truck wheels wherein the driving is balanced and there is no tendency to side thrust in one direction.

A further object of the invention is to provide an improved internal gear drive for motor trucks and the like.

Other objects and advantages of the invention will become apparent throughout the following description.

These objects I have attained by the combination and arrangement of parts shown in the accompanying drawings, wherein for the purpose of illustration is shown a preferred embodiment of my invention, and wherein, Figure 1 is a plan view of the rear end of a truck showing my invention applied thereto, Fig. 2 is a section taken on the line 2—2 of Fig. 1, the dust plate being removed for the purpose of clarity, Fig. 3 is a section taken on the line 3—3 of Fig. 2, and, Fig. 4 is a perspective view of one end of an axle constructed to allow the application of my invention to motor trucks.

Referring now more particularly to the drawings, the numeral 16 indicates the body frame of a truck having secured thereto in any suitable manner the axle 17 to which in turn is secured the usual differential 18 having extending from each side thereof shafts 19. The differential used is preferably that shown in my copending application, Serial No. 305,725 filed June 21, 1919, of which this application is a division, although not necessarily restricted to this construction. It will be noted that in the construction of my invention the drive shaft is not embodied in the rear axle but is arranged to one side thereof.

The ends of the axle 17, and the construction employed at each end of the drive shafts 19, and upon the driving wheels 23, being exactly the same, the description of but one will be sufficient.

The axle 17 is provided adjacent its end with radial arms 20, terminating in their outer ends in journals 21. The end of the axle is provided with a stub axle 22 arranged centrally thereof and centrally disposed with regard to the journals 21 of the radial arms 20. The stub axles 22 comprise tapered portions $22^a$ formed on the outer end of the stub axles and straight portions $22^b$ formed on the ends of the stub axles next adjacent the axle 17 proper.

A driving wheel 23 is rotatably mounted upon the tapered portion $22^a$ of the stub axle and has secured thereto by means of bolts 24 a plate 25 embodying an outstanding flange 26. The flange 26 is provided internally with gear teeth 27 forming an internal gear.

The end of the driving shaft 19 projects through one of the journals 21 carried by the radial arms 20, and is provided with a driving pinion 28 having the teeth thereof meshing with the teeth 27 of the flange 26. Mounted in the remaining journals 21 of the radial arms 20 are stub shafts 29 provided with idler pinions 30, which also mesh with the gear teeth 27 of the flange 26.

It will be seen that the construction shown, and thus far described will of itself support the driving wheels and prevent thrust by the internal gear formed by the flange 26 and 27, as this thrust is taken up by the equally spaced pinions 28 and 30. It has been found however that this thrust will cause considerable wear in the journals 21 by the stub shaft 29, and thus allow of play which will cause the driving wheel 23 to come loose and wobble. This wear I have eliminated by placing about the portion $22^b$ of the stub shaft 22, a gear 31 which meshes with the pinions 28 and 30, eliminating the stress and strain placed thereon when the truck is running.

In actual practice at least three of the radial arms 20, will be provided, equidistantly spaced about the axle or an equivalent thereof. The pinions 28 and 30 support the gear 31 in such a manner that it is not necessary that the same be fitted for rotation upon the stub axle but may be provided with an enlarged central opening affording spaces between the interior wall thereof and the portion 22ᵇ, of the stub axle 22, as at 32.

It will be obvious to those familiar with the art that it is not necessary that the radial arms 20 be provided, as the stub axles might readily be mounted in journals formed in the dust plate 33. Many other changes, of a similar character, and, of the arrangement, shape, and size of the various parts being obviously possible, I do not limit myself to the particular construction hereinbefore set forth, but may make any such changes without departing from the spirit of the invention, or the scope of the subjoined claims.

What I claim is:

1. In driving gearing for motor vehicles, an axle, a driven wheel, embodying spokes, mounted upon each end of said axle, a plurality of arms mounted adjacent each end of said axle, one of said arms adjacent each end of the axle being in substantially horizontal alinement with the axle, a drive shaft mounted in said last named arms, driving pinions mounted on the outer ends of said shaft, idler pinions mounted on the other of said pinions, and an internally toothed gear carried by and arranged inwardly of each of said drive wheels and meshing with said pinions.

2. In driving gearing for motor vehicles, an axle, a drive wheel, embodying spokes, mounted upon each end of said axle, a plurality of substantially equidistantly spaced arms mounted adjacent each end of said axle, one of said arms adjacent each end of the axle being disposed forwardly of said axle and said arms being in axial alinement with each other, a drive shaft mounted in said last named arms, driving pinions mounted on the outer ends of said shaft, idler pinions mounted on the other of said arms, an inner gear meshing with each of said pinions, and an internally toothed gear carried by and arranged inwardly of each of said drive wheels and meshing with said pinions.

In testimony whereof I affix my signature in presence of two witnesses.

EDGAR JAMES.

Witnesses:
J. O. SHUFORD,
W. C. ASHING.